United States Patent [19]

Su

[11] 3,991,995
[45] Nov. 16, 1976

[54] ELECTROSTATIC DOCUMENT HANDLING APPARATUS

[75] Inventor: Chauchang Su, West Bloomfield, Mich.

[73] Assignee: Burroughs Corporation, Detroit, Mich.

[22] Filed: Jan. 5, 1976

[21] Appl. No.: 646,557

[52] U.S. Cl. ............................... 271/64; 271/182; 271/193; 271/DIG. 3
[51] Int. Cl.² ........................................ B65H 29/58
[58] Field of Search ............... 271/64, 193, DIG. 3, 271/177, 181, 182; 226/94

[56] References Cited
UNITED STATES PATENTS 2,814,398   11/1957   Coleman ......................... 271/64 X
3,642,362   2/1972   Mueller ............................ 226/94 X Primary Examiner—Richard A. Schacher
Attorney, Agent, or Firm—K. R. Peterson; Edmund M. Chung; Carl Fissell, Jr.

[57] ABSTRACT

High speed electrostatic document handling apparatus wherein an electrostatic charge is deposited on an item-document such as a check and wherein the charge is caused to interact with an electrical field through which the item is obliged to move effective to selectively divert the item into a desired receiving pocket or bin and/or stack the item in the pocket or bin in the original selection order.

8 Claims, 4 Drawing Figures

ELECTROSTATIC DOCUMENT HANDLING APPARATUS

FIELD OF SEARCH

The following patents, among others developed in a search performed on the subject disclosure, are set forth hereinbelow and while considered to be pertinent to the present disclosure are not considered anticipatory thereof as will be indicated hereinafter.

Osborne, U.S. Pat. No. 287,957 and
Weidenbusch, U.S. Pat. No. 450,854

Osborne, U.S. Pat. No. 287,957 relates to the utilization of the attraction which bodies have for each other when charged with electricity of opposite polarities, and the repulsion which they manifest when charged with electricity of the same polarity, for the purpose of holding, feeding and delivering paper and other materials. Electrostatic force is used for the obtaining adhesion between paper and transporting devices as a means of delivering paper.

In a contrast to the foregoing, applicant's invention resides in the utilization of forces derived from charges deposited on paper, interacting with an electrical field effective to deflect or alter the path of movement of items such as documents or checks. Adhesion is not required nor is it used as a means of transport.

Weidenbusch, U.S. Pat. No. 450,854 relates to an apparatus for separately picking up through the agency of frictional or static electricity single sheets of thin and light material, such as paper, light fabric, tin foil and the like, in such a manner that each single sheet removed may be subsequently taken up by hand or by machinery, in order to be fed further on.

In applicant's apparatus electrical fields interact with electrostatic attraction forces in the form of electrostatic charges to divert and stack items such as checks rather than lift items away from other similar items in a stack.

BACKGROUND OF THE INVENTION

The high speed handling of an item such as documents of commerce, i.e., checks, fabricated of paper of varying thickness and size, created a number of problems not the least of which is that of sorting such items and/or stacking the sorted items in pockets or bins without collision, interference or blockage due to the lack of stiffness, rigidity or column strength of many if not most such items.

Electromechanical paper-item handling apparatus is generally old and well known in the art, all such pieces of equipment suffer from the mechanical inertia build up of mechanical parts as the apparatus is run at higher and higher speeds. This places extremely tight tolerance limits on the capability of the machine to respond quickly and accurately to gate selection and/or pocket stacking thereby limiting the overall speed at which the apparatus can be operated.

Electrical and electronic phenomenon are generally inertialess, no moving parts are required and thus no mechanical inertia build up is encountered. Electrostatic forces and electrical fields can be combined in such a manner as to cause movement of items at high speeds within limits without regard to the size and/or thickness of the item thereby enabling the construction and operation of item handling apparatus which is capable of extremely high speeds.

Summary of the Invention

In item sorters, such for example as check sorters, the inherent actuation time of the electromechanical gates or pocket selection devices limits the throughput of the apparatus at any item transport speed. In order to increase the throughput without resort to higher transport speeds the present invention contemplates the utilization of electrostatic gate or pocket selection and item stacking effectively eliminating the basic inertia problems which cause the electromechanical apparatus to be so much slower.

A charging device, i.e., corona discharge apparatus, is employed to deposit an electrostatic charge of one polarity on the item while an electrical field of relatively high intensity is set up across the gate selection area producing interaction between the two so as to cause the item to be diverted out of the incoming item pathway to the desired pocket or bin without mechanical or electromechanical selection.

In the stacking area, the kinetic energy of the item must be absorbed and the item brought to an abrupt stop. It is also required that the items in any pocket be stacked in the same sequence as the items enter the pocket. This requires that the trailing edge of one item and the leading edge of the next succeeding item be kept from colliding with each other.

In high speed item sorters the kinetic energy of an item may be of such a level that the shock waves created by the impact of the item with the pocket bottom tends to cause the trailing edge of the document to weave and flutter and thus increase the possibility of collision with the next incoming item.

The present invention overcomes these problems by placing electrostatic attracting and repelling members at the side walls of each pocket or bin and selectively applying electrical potentials thereto such that the trailing edge of the first item is deflected toward one side wall area while the leading edge of the next incoming item is deflected toward the opposite side wall area with the two wall areas of deflection separated and downstream from one another. Collision between items is avoided and positive stacking of items at extremely high speed without mechanical or electromechanical assist is thereby accomplished.

Other modifications, features and advantages of the present invention will be apparant from the following detailed description taken in conjunction with the accompanying drawings.

BRIEF DESCRIPTION OF THE DRAWINGS

In the accompanying drawings.

DESCRIPTION OF THE PREFERRED EMBODIMENT

A common, if not a basic drawback with electromechanical item sorters is the relatively low throughput occasioned by the mechanical inertia of the gate or pocket selection and stacking mechanism. Since the mechanical parts must operate in a finite time frame this obviously limits the ultimate speed of operation of the apparatus and tends to slow the throughput regardless of the basic transport speed of the overall machine. In the stacker area the mechanical stacking mechanism suffers the same disability in that the mechanical inertia of the elements involved cannot respond promptly enough to prevent the leading edge of one item from colliding with the trailing edge of another resulting in a collision and perhaps jamming of the system.

The present invention may be embodies in apparatus of the type illustrated, described and claimed in U.S. Pat. No. 3,114,902 to L. L. Tanguy, Jr., entitled "Item Transport Monitoring System" assigned to the same assignee as the present invention. The disclosure of this patent is incorporated herein by reference by way of giving environmental background and additional description of the operation of item sorting apparatus as well as for the technical details of document item detection and transport.

Figure 1:
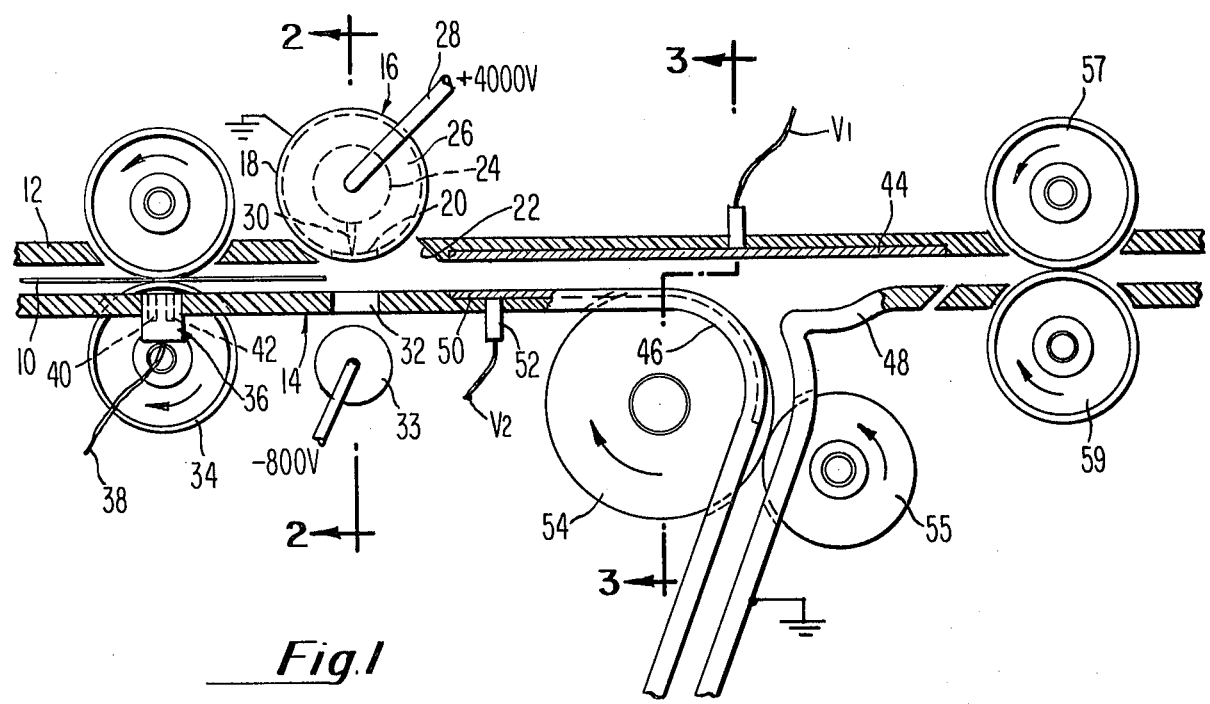
FIG. 1 is a top plan view partially in section of the present invention illustrating the positioning of the electrostatic corona charging member as well as the electrical field generating members of the pocket selection mechanism.

The present invention relates to item-document gate selection and item pocket stacking apparatus wherein, as seen first in FIG. 1 of the drawings, an item 10, for example a bank check, bearing certain required indicia thereon both in printed ink as well as magnetic ink characters, is adapted to be fed by transport means, not shown, between two parallel upstanding opposed side wall members 12 and 14 to an electrostatic charge generating device 16 disposed adjacent to the item pathway. Member 16 is further characterized as a corona discharge device comprising a hollow conductive tubular member 18, a portion of the periphery of which is provided with a plurality of openings or orifices 20 adapted to face a slotted opening 22 in side wall member 12. An elongated dielectric member 24 coaxially mounted in the tube member 18 is retained therein by end caps 26 also of dielectric material. A coaxial conductor 28 extends through the middle of member 24 and is provided with a plurality of corona discharge members in the shape of elongates spike-like elements 30 linearlly arranged from top to bottom along the length of the member 16. Each spike 30 projects outwardly towards the opening 22 and the item pathway between wall members 12 and 14. The central conductor 28 is adapted to be connected to a source of positive high voltage in the first instance, as will be explained further hereinafter.

Front wall member 14 as viewed from above in FIG. 1 is also provided with a set of complementary openings or orifices 32 aligned with openings 22 in rear wall member 12 for purposes to be explained shortly. The outer shell 18 of member 16 is adapted to be at ground potential effective when voltage is applied thereto to produce the effect known as corona discharge from the ends of spikes 30. The corona discharge ionizes the air between the walls 12 and 14 in the vicinity of the openings 22 and 32, so that electrostatic charge is deposited on the item 10 as it moves through the item pathway by means of the item drive pressure rollers 34 and 35. Member 33 opposite members 30 increases the efficiency of the charge generator 16.

Adjacent to the roller 34 and slightly above this member is the document detection device 36 including electrical interconnection means 38 for connecting the device to the electrical circuitry utilized with the present invention. The document or item detector 34 comprises a light emitting diode 40 and a photo transistor pick up member 42. The device functions in the reflective mode to indicate the presence of the item 10 in the pathway at the corona generating stations and prior to the item reaching the gate selection apparatus which will now be described.

Downstream from the corona charging device 16, to the right in FIG. 1, the rear wall member 12, which is fabricated of insulating dielectric material, such for example as thermoset plastic, is provided with a conductive member 44 with means adjacent and in contact therewith for applying a high potential $V_1$, for example $-800$ to $-1,000$ volts, thereto as seen in FIG. 1. The opposite or front wall member 12 has it's rightward portion curved into a sharp, backwardly turning radius 46 leading to a pocket or bin, not shown. The wall portion 48, made of conducting material, confronting the radius 46 is angled and slightly irregularly shaped so as to prevent the item from being accidentially deflected into the pocket area when this particular gate has not been selected, as will be described further on herein.

Wall member 14 in the vicinity of the gate selection area and radius 46 is also of dielectric material such as plexiglas and is provided with a conductive overlay 50 including means 52 for applying a high potential $V_2$, for example $-800$ v to $-1,000$ v, as seen in FIG. 1. Drive rollers 54 and 55 are employed as a diverting means and for driving the item 10 into the bin should the particular gate herein described be selected. Driver rollers 57 and 59 are employed as a means for driving item 10 further along the pathway should the particular gate herein described not be selected.

The operation of the apparatus embodying the present invention is as follows: assume that the item has been transported at relatively high speed and has been assigned the pocket (not shown) which is associated with the apparatus illustrated in FIG. 1. Corona discharge charging device 16 which is energized at all times, deposits an electrostatic charge on the item 10 as the item passes before it on its way to the designated pocket. A voltage $V_2$ in the neighborhood of $-800$ volts is applied to member 50 while member 44 is held at a zero potential $V_1$, that is ground. The conductive right wall member 48 is maintained at ground potential. In directing the item 10 into the pocket entranceway the electrostatic force due to the charge on the item 10 and the electrical field between the wall electrodes 44 and 50 and between 50 and 48 needs only be sufficiently large as to over come the centrifugal force of the item 10 traveling along the item pathway and around the diverting roller 54.

If the item 10 were to travel further along the pathway and had not been assigned to the pocket, voltages $V_1$ in the neighborhood of $-800$ volts and $V_2$ at ground should be used. The electrostatic force would then uge the item 10 to remain in the pathway.

Figure 4:
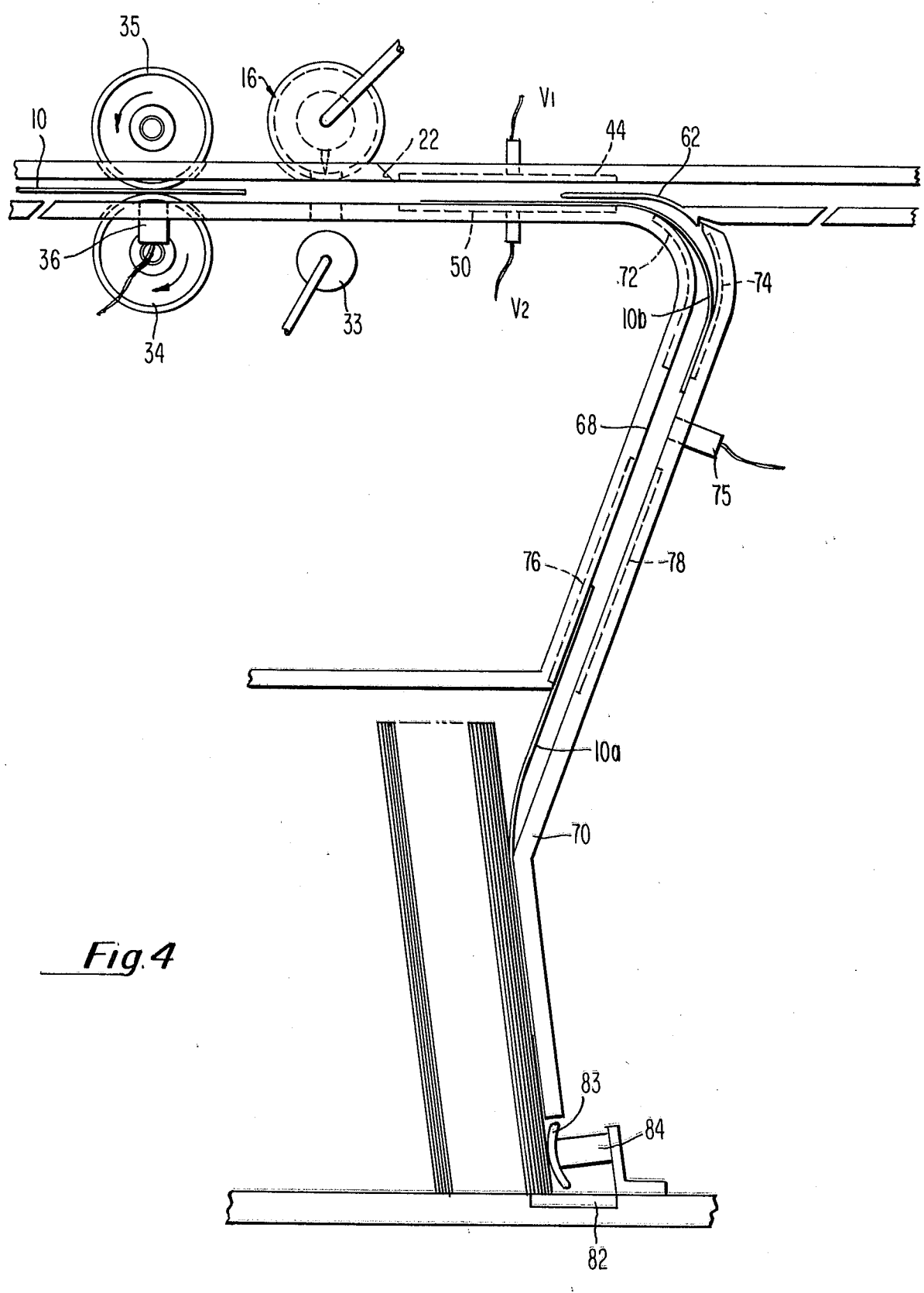
FIG. 4 is a schematic top plan view of a second pocket selection mechanism and the stacking-deflecting mechanism for the present invention.

In order to reduce the required electrostatic force required to divert the item as in FIG. 1, the arrangement of FIG. 4 may be resorted to. Here gate selection can be made to occur along a straight line path instead of the curved path of FIG. 1, thus eliminating the need of overcoming the centrifugal forces required. In this case, the only force required is the force to deflect the document into one of the two gate selection openings. Once this is accomplished, the document 10 will be guided by mechanical forces only along the curved path and into the pocket, not shown.

In FIG. 4 the central deflection electrode 62 may be of conducting material and held at zero potential.

As earlier mentioned herein, electrostatic forces can be utilized for stacking items after they have been gate selected and have entered the so-called pocket area of the apparatus. In the stacker, the kinetic energy of the document must be absorbed and the document brought to a stop very abruptly, it is also required that the documents coming into the pocket or stacker be stacked in the same sequence as they enter the pocket. This requires that the trailing edge of a document and the leading edge of the next succeeding document be kept from colliding with each other. For a high speed sorter, the kinetic energy of a document may be of such a level that when a snubber and a bumper alone are relied upon to absorb this energy, the shock waves created at the impact on the bumper tends to cause the trailing edge of the document to weave and flutter. This increases the possibility of collision with the next document. These problems can be eleviated by utilization of electrostatic forces in an arrangement as shown in FIG. 4. Here the gate selection area has been curved with a radius that bends back on itself and the side wall members are continued, the inner wall member extending only partially into the pocket area, as indicated at 68 while the outer wall member continues on into the bottom of a pocket as indicated at 70.

Two sets of electrode wall members 72, 74, for the upper pair and 76, 78 for the lower pair are provided along the document path at the pocket or bin entrance. Wall member 72 is held at a positive potential with respect to wall member 74 such that a document will be deflected toward 74, as the leading edge of item 10b shown in FIG. 4.

Figure 2:
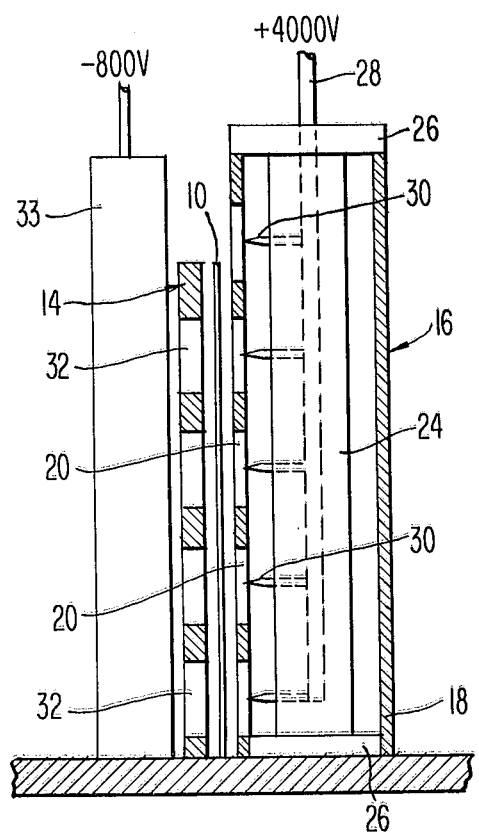
FIG. 2 is a side elevational sectional view along the line 2—2 of FIG. 1 illustrating the corona charging member in conjunction with the document edge detector.
Figure 3:
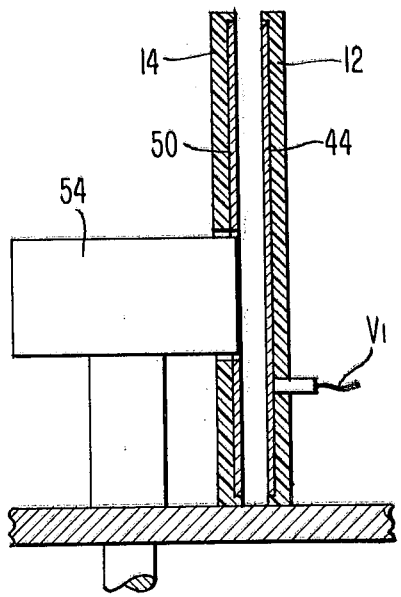
FIG. 3 is a side elevational view along the line 3—3 of FIG. 1 showing the field generating member in conjunction with the turn-around roller for the pocket selection member.

Assuming that the documents or items have been deposited with positive charge over their surfaces for gate selection purposes, as described with respect to FIGS. 1 through 3 inclusive, wall member 76 is normally held at a positive potential with respect to member 78 such that the document continues to be deflected toward the outer wall member 70. A document detector 75, of same type as 36, is provided between 74 and 78. When the trailing edge of the document is detected at 75, the potential of 76 and 78 are reversed, that is, 78 is held at a positive potential with respect to 76 such that the trailing edge of the document will be deflected toward 76 as 10a shown in FIG. 4. When the leading edge of the document 10b is detected at 75, the potential of 76 and 78 are again reversed. This reduces the chance of item collisions. Furthermore, the surface of wall member 76 can be made to possess a high coefficient of friction, for example rubber, thus the kinetic energy of document 10a can be absorbed in part by the frictional force at wall member 76. The remaining energy can then be safely handled by the snubber 83 and bumper 82 at the base of the stacker pocket.

If a shock wave is created while 10a is being decelerated at wall member 76, it will cause the leading edge of 10a to weave but this will not cause any stacking problem. As soon as the trailing edge of 10a passes through the 76 and 78 wall area the polarity of the voltage across this area is reversed so that deceleration of 10b does not occur at its leading edge while the 76–78 wall area is active.

Alternatively, a negative charge is deposited on a document surface close to the leading edge while a positive charge in the region close to its trailing edge then the electrode set 74–74 can be omitted and the requirement of reversing the voltage polarity between 76 and 78 can also be eliminated.

There has thus been described a novel and heretofore unknown method and apparatus for sorting, selecting and stacking relatively thin items at high speed without the use of electromechanical apparatus thus avoiding inertia problems and increasing the throughput of the sorter many fold.

What is claimed is:

1. High speed document handling apparatus utilizing electrostatic gate selection and stacking comprising,
    an item pathway along which items, such as checks are adapted to be fed at relatively high speed,
    means in said pathway for detecting the presence of an item and for signaling the item presence to associated equipment,
    means in said pathway for generating a corona discharge cross said pathway capable of inducing an electrostatic charge on said item moving there past, and
    means in said pathway for generating an electrical field normal to said pathway in response to the signal from said item detecting means effective to interact with said electrostatic charge on said item for deflecting said item out of said pathway and into an item receiving bin or pocket.

2. The invention in accordance with claim 1 wherein said apparatus further includes means in said pathway for causing said electrostatic charge to interact therewith effective to cause said item to remain in said pathway and move therealong without deflection.

3. The invention in accordance with claim 1 wherein said apparatus further includes means for causing said electrostatic field and said corona discharge on said item to effectively move said item into a stacking bin without interference from the next succeeding item.

4. The invention in accordance with claim 1 wherein said electrostatic corona discharge generating means is arranged adjacent to said item pathway and comprises an elongate member having a plurality of orifices therein and a plurality of sharp, spike-like members adapted to discharge the corona through said orifices into said item pathway.

5. The invention in accordance with claim 1 wherein said detection device comprises a light emitting diode and a reflective photo transistor, said device being located in said item pathway such that the light from the light emitting diode is interrupted by an item passing therebefore to signal the presence of the item in said pathway.

6. The invention in accordance with claim 1 wherein said item pathway further includes oppositely disposed members between which an electrical field is generated of a polarity operatively interactive with the electrostatic charge deposited on said item by said corona charge generating device to force said item to be deflected out of said item pathway.

7. The invention in accordance with claim 1 wherein said item pathway further includes a member therein effective to divide said pathway into two parallel separate ways depending upon the polarity of the potential applied to said member whereby the polarity of said member relative to the polarity of said electrical field causes the item to take one or the other of said two pathways.

8. The invention in accordance with claim 1 wherein said item pathway further includes first electrical field generating means arranged at the entrance to an item pocket and a second electrical field generating means arranged adjacent to said pocket and separated from said first field generating means, and electrical means for applying potentials of opposite polarities to said first and second means as desired effective to stack said items in the item pocket without the first entering item interfering with the second incoming item.

* * * * *